Aug. 9, 1932.     H. ALBERTINE     1,871,400
PORTABLE GREASE GUN
Filed June 26, 1929     2 Sheets-Sheet 1
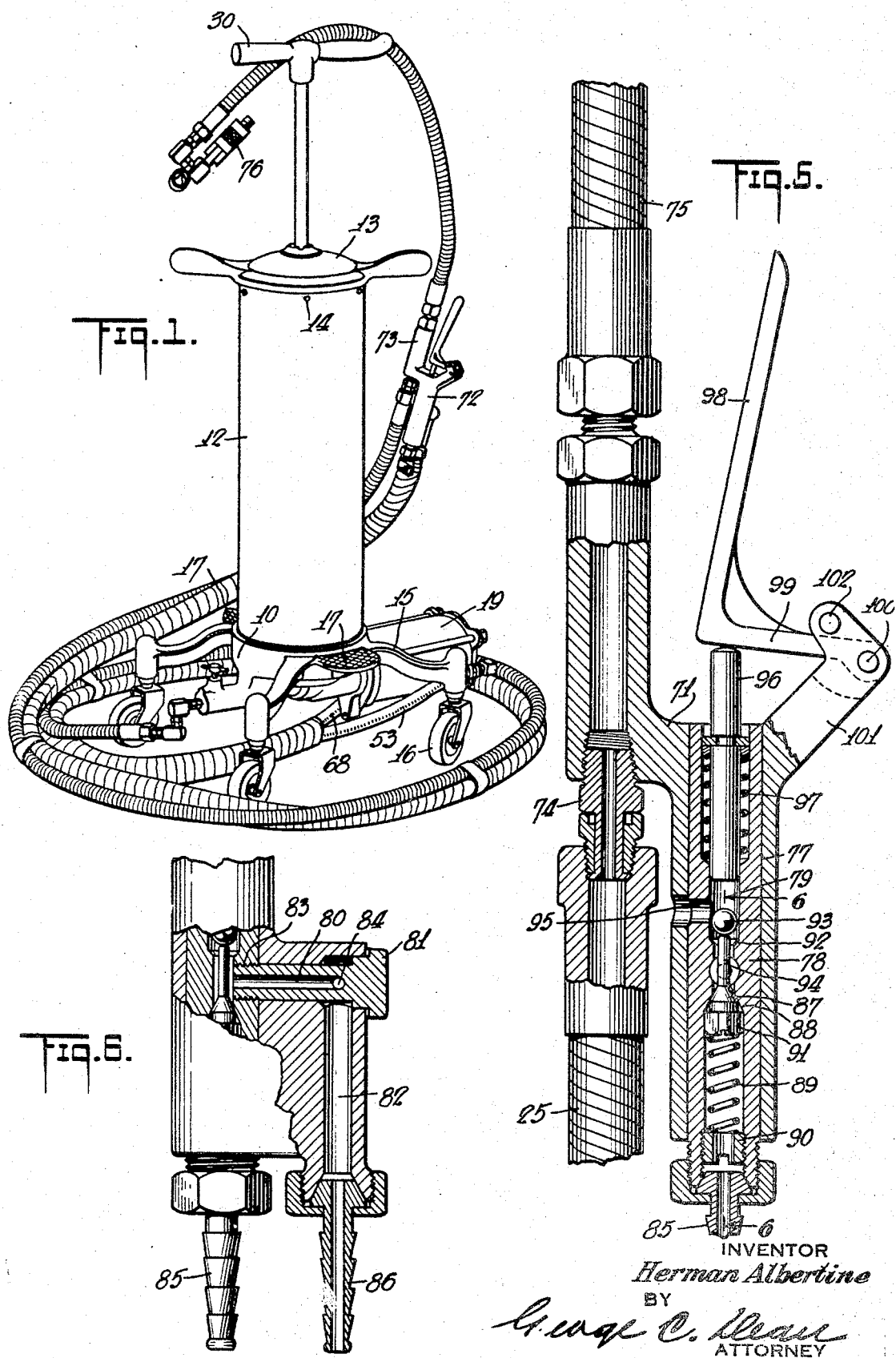

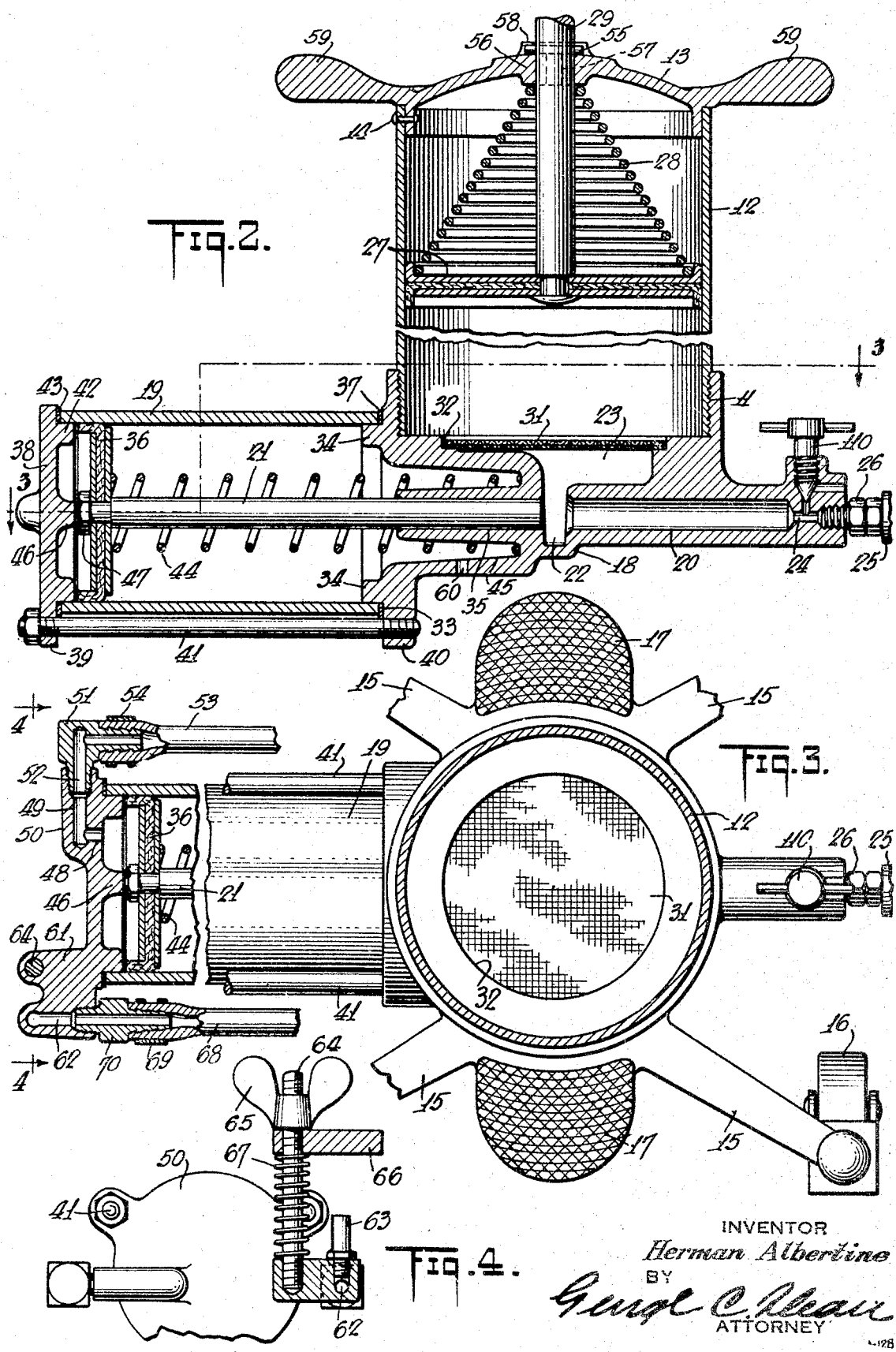

Patented Aug. 9, 1932

1,871,400

UNITED STATES PATENT OFFICE

HERMAN ALBERTINE, OF RUTHERFORD, NEW JERSEY, ASSIGNOR TO ROGERS PRODUCTS COMPANY, INC., A CORPORATION OF NEW JERSEY

PORTABLE GREASE GUN

Application filed June 26, 1929. Serial No. 373,721.

The present invention is concerned with grease guns of the character in which lubricant from a reservoir is passed by a high power pump into a pressure tight conduit for delivery at the bearing or other point requiring lubrication. The conduit, usually in the nature of a flexible hose carries a coupling member at its end for application to the usual inlet fitting on an automobile chassis or other apparatus to be lubricated.

In accordance with the present invention the pump is of the fluid operated type and the supply of motive fluid (usually compressed air) is controlled from a valve arranged to be conveniently manipulated by an operator handling the grease delivery hose. In fact, the air line which supplies motive fluid and the grease line which delivers to the bearings are preferably mechanically interconnected by a coupling of special construction in which the control valve is mounted.

The invention is moreover particularly adapted for embodiment in a relatively large capacity, portable grease gun for garage use. Preferably a relatively massive reservoir is mounted on a truck which carries fluid operated high pressure pump. The truck may be in the nature of a casting which defines the pump cylinder and also one end of a cylinder for the pump operating fluid actuated piston, this casting having a socket into which the upright reservoir may be screwed, serving as a bottom for the reservoir and providing communication between the reservoir and the pump.

*For convenience of manipulation when removing and refilling the reservoir, the truck, or rather the cast body thereof, is provided with steps adapted to sustain the operator in a convenient position for the application of full manual power when retracting the spring follower piston which feeds grease from the reservoir to pump, or when bodily unscrewing the reservoir prior to recharging it with grease.

The invention may be more fully understood from the following description in connection with the accompanying drawings, wherein:—

Fig. 1 is a perspective view of a grease gun embodying the invention,

Fig. 2 is a broken vertical sectional view therethrough,

Fig. 3 is a sectional plan view taken approximately on the staggered line 3—3 of Fig. 2, Fig. 4 is a vertical sectional detail on the line 4—4 of Fig. 3, Fig. 5 is an enlarged longitudinal sectional detail through the valve mechanism which controls the supply and exhaust of motive fluid, Fig. 6 is another sectional detail through the valve mechanism taken approximately at right angles to Fig. 5.

The supporting truck for the reservoir includes a base casting 10 formed with an upwardly facing socket 11 into which the lower end of the grease reservoir cylinder 12 is adapted to be screwed. This cylinder may comprise a tube about 6 inches in diameter and 18 inches long, closed at its top by a cap 13 riveted or otherwise secured in place as by rivets 14.

Integral with the base 10 are a plurality (usually four) generally radially extending legs 15 which at their outer ends are supported on relatively massive free swivelling casters 16. The length of the legs 15 is such that an operator may conveniently stand on the steps 17 which are integral with the casting 10 and disposed closely adjacent the socket 11 without danger of tipping over the truck regardless of the positions of the casters 16.

The slight downward curvature of the legs 15 and the height of the casters 16 is sufficient to provide clearance for the pump casing 18 pendent from and integral with the casting 10 as well as for the motor cylinder 19 axially aligned with the pump chamber.

The pump casing 18 is bored to provide an elongated cylinder 20 in which works an unjacked plunger rod 21 of the self porting type. When this plunger is fully withdrawn as in Fig. 2 it opens an annular inlet port 22 communicating with a well 23 in the bottom of the socket 11 and as the piston moves forwardly the grease which has entered the pump cylinder through this part is expelled at high pressure through a restricted outlet 24 at the end of cylinder 20 and thence into the pressure sustaining flexible conduit 25 which is coupled as at 26 to the outlet 24.

The piston 27 which serves to force grease into the pump cylinder when the piston is withdrawn is more or less conventional. It is of the double cup washer type slidable in the reservoir and urged downwardly upon the grease therein by a helical spring 28 reacting against cap 13, and encircling a piston rod 29 which is slidable through the cap and provided with a handle 30 at its upper end. This handle permits the plunger to be lifted upwardly compressing spring 28 prior to recharging the cylinder with grease. Spring piston 27 forces the grease into the well 23 through a filter pad or plate 31 mounted in a suitable recess 32 above and around the top of the well.

In order to lock the piston 27 in its elevated position with the spring 28 under compression, the piston rod 29 carries a cross pin 55. The cap 13 has a central piston rod guiding boss 56 provided with diametrically opposite recess 57 intersecting the central opening of the boss and providing clearance of the upward movement of the projecting ends of pin 55. When the piston rod has been drawn upwardly to an extent where pin 55 is disposed exteriorly of the cap 13 the rod may be rotated at right angles to bring the ends of the pin 55 above suitable grooves 58 on the outer surface of the boss 56 which block spring impelled downward movement of the piston when the handle is released.

With the piston in its elevated position the reservoir 12 is unscrewed from the socket 11 and the reservoir is recharged with grease through its open lower end.

In order to facilitate unscrewing of the reservoir for recharging purposes the cap 13 is preferably provided with laterally projecting handle portions 59 which afford adequate leverage for twisting the reservoir to unscrew it from the socket. The steps 17 on the truck are principally for the purpose of facilitating the manual retraction of the piston 27 and the manual unscrewing of the reservoir. An operator standing on these steps is enabled to grasp the handle 30, conveniently pull it upwardly far enough to effect locking thereof in the manner above described and from the vantage point of the steps to grasp the handle 59 and to rotate in the cylinder 12 to effect its removal from the truck.

When the plunger 21 is in its fully retracted position its forward end is guided in a sleeve 35 forming a continuation of a cylinder 20, the other end of the plunger being connected to a motor piston 36 working within the cylinder 19.

The base casting 10 serves as one head of the cylinder 19 being provided with a flat abutment surface 33 from which projects the centering boss 34. Cylinder 19, in the nature of an open ended tube, is slipped over the boss 34 and held tightly against a packing ring 37 lying against the abutment face 33. The other cylinder head 38 is a casting provided with radial apertured lugs 39 aligned with similar lugs 40 on the base casting 10. Tie bolts 41 connecting the aligned lugs 39 and 40 serve to draw the head 38 firmly against the outer end of cylinder 19 and to force the inner end of the cylinder 19 firmly against the packing 37. Cylinder 19 is preferably provided with a centering portion 42 to fit within the cylinder and the abutment surface between the cylinder end and the head 38 is packed by a ring 43.

Movement of the piston 36 in a direction to effect the discharge stroke of the plunger 21 is resisted by coiled expansion spring 44 encircling the plunger, acting directly against the piston 36 and pocketed in a relatively deep annular groove 45 which encircles the sleeve 35.

Spring actuated movement of the piston 36 is checked by a stop lug 46 integral with the cylinder head 38 and engaging the nut 47 which secures the piston 36 in place on the rod 21. This stop serves to prevent injury to the cup washer of the piston 36 as the latter in its idle stroke is snapped smartly back by the spring 44.

The air inlet to the cylinder 19 is through a port 48 communicating with a radial bore 49 formed in an enlarged portion 50 of the cylinder head 38. An L coupling 51 has one leg screwed into a socket 52 into the outer end of the bore 49 and its other end suitably shaped for the reception of air hose 53 which may be held in position in any suitable manner as by the conventional hose clamp 54. There is no tendency toward air checking of the piston 36 due to the provision of the relatively capacious vent 60 which permits air in advance of the piston 36 to be expelled from the cylinder 19 on the working stroke of the piston and likewise permits air to be sucked in rapidly behind the piston on its spring impelled idle stroke.

Many expedients might be resorted to for coupling the air supply line of a compressor or storage tank to the grease gun and to control the flow of air from this line into the line 53 and thence to the motor piston 36. In practice the cylinder head 38 is provided with an integral extension 61 (see Figs. 3 and 4) which extension is provided with an air passage way 62 therein, the inlet of which is guarded by a conventional air inlet check valve 63 to which the supply line (not shown) from a compressor or other suitable source of compressed air may be coupled.

In order to conveniently hold the air supply line on the valve 63, I may resort to the use of a special type of nozzle holding clamp illustrated in Fig. 4. This clamp consists of a screw 64 on the extension 61 having an adjustable wing nut 65 on its outer end against which a swivel arm 66 encircling the screw is held by a coil expansion spring 67 reacting against the member 61. The nut 65 may be adjusted along the screw to regulate the distance between the arm 66 and the inlet valve 63 and the arm itself freely swivelling may be conveniently swung to position to clamp the inlet nozzle fitting of the air line in position.

The air which enters the passage 62 through the valve 63 does not flow directly to the air line 53 which supplies the motor but instead flows through a hose 68 to the control valve mechanism shown in Figs. 5 and 6 and then enters the line 53.

The hose 68 may be coupled in any suitable manner as at 69 to a fitting 70 screwed to the outlet end of the passage 62.

The control valve mechanism best seen in Figs. 1, 5 and 6 is housed within a unitary coupling element designated generally at 71. Member 71 consists generally of a valve casing portion 72 and a grease line coupling portion 73, the latter being in the nature of an open ended tube laterally and longitudinally offset from the valve casing 72.

Suitable pressure tight coupling elements 74 connect the grease line 25 with one end of the member 73, the other end of this member being connected by a short length of flexible pressure tight hose 75 to the terminal fitting 76. The latter may be of any conventional type for application to the usual bearing inlet fittings of the machine to be lubricated.

The valve casing 72 is provided with a bore 77 extending longitudinally thereof and adapted to mount a control valve assemblage borne within a sleeve 78 which substantially fits the bore 77. The sleeve 78 is in turn provided with a central longitudinal bore 79 communicating through a dead end passage 80 in a hollow screw 81 with the top of a bore 82 formed in the valve casing 72 parallel with the bore 79.

The end of the screw 80 engages a socket 83 in the sleeve 78 which socket intersects bore 79. As the screw 81 is tightened the sleeve 78 is drawn tightly against one side of the bore 77. By this construction air may flow through a passage 80 and a radial bore 84 into the passage 82 without any leak or escape of air around the screw or around the sleeve 78.

The air line 68 is coupled as at 85 into the lower end of the bore 79 and the air line 53 is coupled as at 86 into the lower end of the bore 82. The flow of air through the control fitting from 68 into 83 is controlled by a valve member 87 working against a downwardly facing seat 88 in the bore 79. A coiled expansion spring 89 backed against a collar 90 in the lower end of the bore 79 engages the square head 91 of the valve 87 and urges the valve against its seat. The air passage 80 within the hollow screw 81 intersects bore 78 between downwardly facing valve seat 87 and an upwardly facing valve seat 92 with which a ball valve 93 is adapted to coact. When the valve 93 is unseated an air vent 95 is opened and air may escape freely from the cylinder 19 through the air line 53 and passages 82, 84, 80 and 79 to the vent. When the valve 93 is seated it acts to unseat the control valve 87 by depressing the valve extension 94 thereby permitting flow of air from the line 68 directly into the line 53 and supplying motor fluid to the piston 36 to urge the latter forwardly to expel the grease in advance of the pump plunger 21.

Means is provided for manually depressing valve 93 to open the control valve 87 and supply fluid under pressure to the motor. This means consists of a plunger 96 working within the upper end of the bore 79 and normally held in elevated position by coiled expansion spring 97. To effect depression of the plunger against the action of the spring a generally L shaped lever 98 has the free end of its shorter leg 99 pivoted at 100 in a bracket 101 integral with the valve casing. Upon movement of the lever 98 in a counterclockwise direction the heel of the lever engages the plunger 96 forcing it downward causing it to engage the ball 93 and to seat this ball while unseating the control valve 87.

Spring 97 holds the plunger 96 in close following engagement with the heel of the lever 98 when pressure on this lever has been released. The movement of the lever 98 in a clockwise direction, however, is limited by a stop pin 102 and consequently the spring urged movement of the plunger 96 is limited as the lever comes to rest against this stop.

The handle portion of the lever 98 is arranged in close juxtaposition to the offset grease line coupling portion 73 of the fitting 71. By virtue of this arrangement an operator may conveniently manipulate the fitting 76 with one hand and hold the grease line and the lever 98 with the other hand. This arrangement is of course conducive to facilitating manipulation of the grease line and regulation of the amount of grease supplied.

It is believed that the foregoing description discusses the operation of the apparatus with sufficient clarity to render further detailed description of the operation superfluous. Suffice it to say that if an air line is coupled to the valve 63 it is merely necessary to swing the lever 98 toward the grease line to permit free flow of compressed air into the motor cylinder and it is merely necessary to release the handle 98 to permit free venting of the motor cylinder through the opening 95.

As the motor piston 36 is reciprocated by air pressure and its restoring spring, an extremely powerful stroke is imparted to the pump plunger 35 and grease under tremendous pressure is forced through the line 25, 75.

It may prove desirable to permit venting of any air which may have become entrapped in the reservoir with the grease. Such venting may be conveniently accomplished by unscrewing the vent valve 110 and permitting the escape of air from the restricted pump outlet 24.

I claim:

1. A portable grease gun including a wheel truck comprising a body casting on traction rollers, an upwardly facing socket in the body and an upright cylindrical grease reservoir, the lower open end of which is screwed into the socket, the socket providing an outlet for grease, a piston in the reservoir tending to force grease through the outlet, the upper end of the reservoir cylinder being closed, the piston including a handle end projecting through the top of the reservoir top and adapted to be manually elevated to withdraw the piston prior to recharging the reservoir, and steps on the truck at opposite sides of the reservoir whereby an operative standing on the steps may substantially straddle the reservoir and conveniently elevate the handle.

2. A grease pump comprising a cylinder adapted to contain grease and a plunger for forcing the grease out of said cylinder; a compressed air motor comprising a cylinder and a piston therein connected to the pump plunger; and a conduit for conveying grease from the pump to the apparatus to be lubricated, said conduit including a relatively long flexible section and a short flexible service section and an intermediate rigid pipe section, said non-flexible section having rigidly connected therewith an elongated section provided with air vent and supply passages and valve mechanism and flexible connecting conduits for supply and exhaust of compressed air to and from the motor cylinder, and separate, spring retracted control element operating by uni-directional movement both to close the vent and to open the air supply valve.

3. A grease pump comprising a cylinder adapted to contain grease and a plunger for forcing the grease out of said cylinder; a compressed air motor comprising a cylinder and a piston therein connected to the pump plunger; and a conduit for conveying grease from the pump to the apparatus to be lubricated, said conduit including a relatively long flexible section and a short flexible service section and an intermediate rigid pipe section, said non-flexible section having rigidly connected therewith an elongated section provided with air vent and supply passages and valve mechanism and flexible connecting conduits for supply and exhaust of compressed air to and from the motor cylinder, a hand grasp lever parallel with said non-flexible section operating by uni-directional movement both to close the vent and to open the air supply valve.

4. A grease pump comprising a cylinder adapted to contain grease and a plunger for forcing the grease out of said cylinder; a compressed air motor comprising a cylinder and a piston therein connected to the pump plunger; and a conduit for conveying grease from the pump to the apparatus to be lubricated, said conduit including a relatively long flexible section and a short flexible service section and an intermediate rigid pipe section connected to the long flexible section by a pipe swivel, said non-flexible section having rigidly connected therewith an elongated section provided with air vent and supply passages and valve mechanism and flexible connecting conduits for supply and exhaust of compressed air to and from the motor cylinder, a hand grasp lever parallel with said non-flexible section operating by uni-directional movement both to close the vent and to open the air supply valve.

5. A grease pump comprising a cylinder adapted to contain grease and a plunger for forcing the grease out of said cylinder; a compressed air motor comprising a cylinder and a piston therein connected to the pump plunger; and a conduit for conveying grease from the pump to the apparatus to be lubricated, said conduit including a relatively long flexible section and a short rigid pipe section, having rigidly connected therewith an elongated section having a bore parallel with that of said rigid section, which bore is provided with air vent and supply passages and valve mechanism and flexible connecting conduits for supply and exhaust of compressed air to and from the motor cylinder and a lever having a hand grasp adjacent and lying in the same direction with said rigid section operating to first close the vent and then turn on the air supply, by continued movement in one direction; and vice versa.

6. A grease pump comprising a cylinder adapted to contain grease and a plunger for forcing the grease out of said cylinder; a compressed air motor comprising a cylinder and a piston therein connected to the pump plunger; and a conduit for conveying grease from the pump to the apparatus to be lubricated, said conduit including a relatively long flexible section and a short flexible service section and an intermediate rigid pipe section connected to the long flexible section by a pipe swivel, said non-flexible section having rigidly connected therewith an elongated section provided with air vent and supply passages and valve mechanism and flexible connecting conduits for supply and exhaust of compressed air to and from the motor cylinder, comprising two mechanically separate valve elements aligned in a passage parallel with the grease conduit one of said elements operating first to close the vent and then to operate the other valve element to turn on the air supply, by continued movement in one direction and vice versa; and means including a lever in hand grasp relation to said rigid section of the grease conduit for operating said valve elements.

Signed at New York, in the county of New York and State of New York, this 25th day of June, A. D. 1929.

HERMAN ALBERTINE.